United States Patent [19]

Coleman

[11] Patent Number: 5,760,945
[45] Date of Patent: Jun. 2, 1998

[54] DEVICE AND METHOD FOR LIGHT MODULATION

[75] Inventor: James Patrick Coleman, Maryland Heights, Mo.

[73] Assignee: Monsanto Company, St. Louis, Mo.

[21] Appl. No.: 798,442

[22] Filed: Feb. 10, 1997

Related U.S. Application Data

[63] Continuation of Ser. No. 472,193, Jun. 7, 1995, abandoned.

[51] Int. Cl.⁶ .................................................. G02F 1/153
[52] U.S. Cl. ................................. 359/271; 359/270
[58] Field of Search ............................... 359/265, 266, 359/269, 271, 270

[56] References Cited

U.S. PATENT DOCUMENTS

| | | | |
|---|---|---|---|
| 3,500,392 | 3/1970 | Maljuk et al. | 359/265 |
| 3,674,342 | 7/1972 | Castellano et al. | 350/336 |
| 3,807,831 | 4/1974 | Soref | 350/336 |
| 3,981,559 | 9/1976 | Channin | 350/336 |
| 4,116,544 | 9/1978 | Soref | 350/336 |
| 4,256,380 | 3/1981 | Barclay et al. | 359/265 |
| 4,345,249 | 8/1982 | Togashi | 340/784 |
| 4,416,516 | 11/1983 | Beni et al. | 350/357 |
| 4,596,722 | 6/1986 | Warszawski | 427/108 |
| 5,080,470 | 1/1992 | Warszawski | 359/265 |
| 5,082,355 | 1/1992 | Warszawski | 359/265 |
| 5,189,549 | 2/1993 | Leventis et al. | 359/271 |
| 5,548,421 | 8/1996 | Miyazaki | 359/54 |
| 5,576,867 | 11/1996 | Baur et al. | 359/87 |
| 5,600,464 | 2/1997 | Ohe et al. | 349/123 |

FOREIGN PATENT DOCUMENTS

| | | |
|---|---|---|
| 43 25 761 A1 | 2/1995 | Germany. |
| WO 94/15246 | 7/1994 | WIPO. |

*Primary Examiner*—Georgia Y. Epps
*Assistant Examiner*—Dawn-Marie Bey
*Attorney, Agent, or Firm*—Howell & Haferkamp, L.C.

[57] ABSTRACT

A light-modulating device and method are disclosed. The device comprises an optically transparent working electrode in contact with an electrolyte layer, and a counter electrode contacting the electrolyte layer. The counter electrode is disposed laterally to the working electrode and the path of transmitted light. The method comprises reversible electrocrystallization of a metal from the electrode layer that increases optical density and decreases light transmission. Also disclosed is a method of manufacturing a light-modulating device.

9 Claims, 2 Drawing Sheets

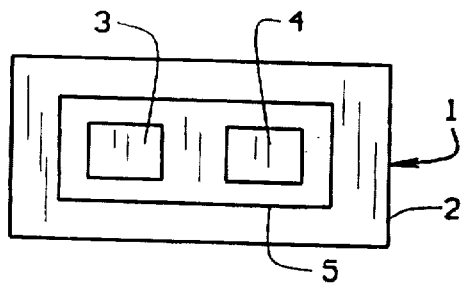
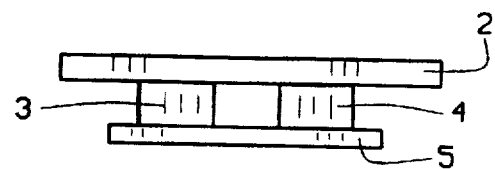
FIG. 1A  FIG. 1B
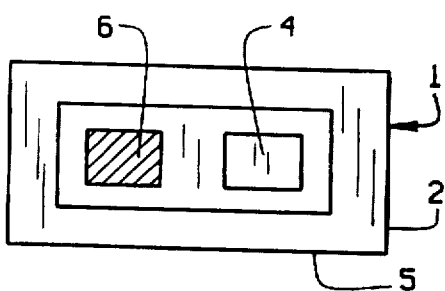
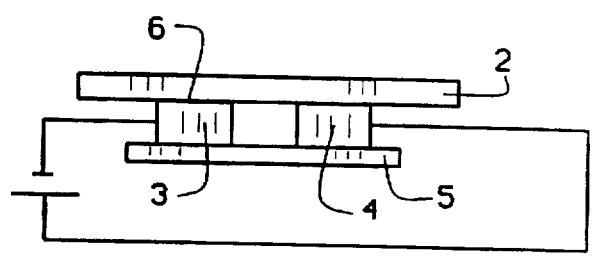
FIG. 2A  FIG. 2B
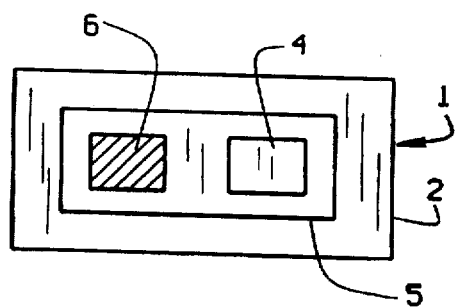
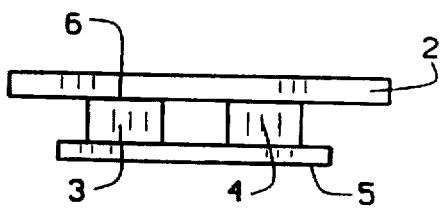
FIG. 3A  FIG. 3B
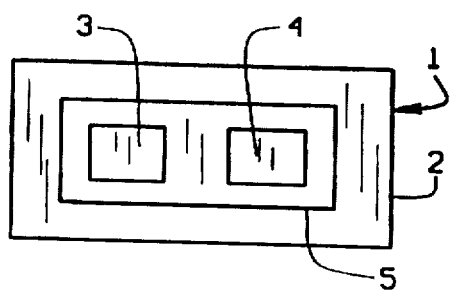
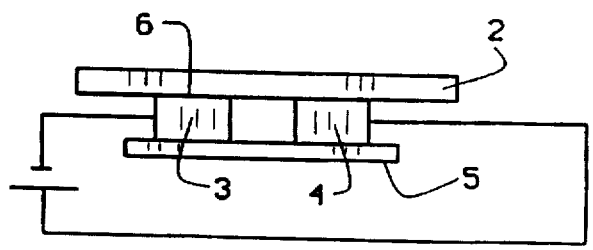
FIG. 4A  FIG. 4B

DEVICE AND METHOD FOR LIGHT MODULATION

This application is a continuation of application Ser. No. 08/472,193 filed on Jun. 7, 1995 now abandoned.

BACKGROUND OF THE INVENTION

(1) Field of the Invention

This invention relates generally to the field of light modulation for projection and/or display and, more particularly, to electro-optical devices and methods utilizing electrochromic materials for modulating light transmission in projection and/or backlight display devices.

(2) Description of the Related Art

Thin light-modulating devices that vary either the amount of reflected or the amount of transmitted light are known in the art for the display of alphanumeric, graphic, and other optical information. Some of these light-modulation devices utilize electrochromic processes that reversibly change color or optical density by electro-chemical oxidoreduction. The electrochromic materials used have different colors or optical densities in the oxidized compared to the reduced states and reversible conversion between oxidized and reduced states is accomplished by application of an electric current.

One such electrochromic light-modulating device and process is disclosed in U.S. Pat. No. 5,080,470, which is incorporated herein by reference. The disclosed device includes a first electrically conductive, optically transparent electrode layer disposed in contact with one face of an electrolyte layer containing an electrochromic material. A second, counter electrode layer contacts with the other face of the electrolyte layer. A "write" phase is achieved by applying a current between the two electrode layers with the first electrode layer serving as a cathode. This produces a reduction and electrocrystallization of the electrochromic material at the interface between the electrolyte layer and the first electrode layer to increase the optical density of the interface region. In the "erase" phase, the current is reversed such that anodic oxidation produces a dissolution of the electrochromic material to return the interface region to its optically transparent state.

SUMMARY OF THE INVENTION

The inventor herein has succeeded in devising a novel device and method that modulates transmitted light using a counter electrode that need not be transparent. In accordance with the present invention, the light-modulating device comprises an optically transparent electrode serving as the working electrode, a second electrode disposed laterally to the working electrode and serving as the counter electrode so that the working electrode and counter electrode are in a side-by-side arrangement, and an electrolyte layer contacting both the working electrode and the counter electrode. Thus, the counter electrode is lateral to the path of the transmitted light, and for this reason, need not be transparent. The working electrode and the electrolyte layer are arranged so that the interface region formed by their contacting surfaces is in the desired pattern of the light transmission or backlight display.

The electrolyte layer comprises (a) water, (b) a salt of a metal which can be reversible deposited from an aqueous solution upon application of an electric current, (c) a water thickening polymeric resin and (d) a neutral salt. Upon applying a negative voltage to the working electrode with respect to the counter electrode, a current passes across the interface region of the electrolyte layer and the working electrode to produce an electrocrystallization of the metal ion, thereby increasing the optical density of the interface region. As the metal salt is deposited on the transparent working electrode in a cathodic half cell reaction, the electrochemical reaction needs to be balanced with an anodic half cell reaction. Thus, the system requires a species capable of participating in a reversible half cell reaction at the counter electrode. Suitable anode reacting species which can be dissolved in the electrolyte layer in bromide or iodide salts. Since the half cell reaction of such halogen salts produces the halogen gas, it is desired to employ a gas-adsorbing anode, e.g. carbon, as the counter electrode. Alternatively, the anode reacting species can be provided as a coating, e.g. of hydroquinone, on the anode.

In another embodiment of the present invention, a process for producing a light-modulating device is provided. The process comprises interfacing an electrolyte layer with an optically transparent working electrode, and interfacing a second counter electrode with the electrolyte layer, wherein the counter electrode is disposed laterally to the working electrode.

Among the several advantages found to be achieved by the present invention include the provision of a device for light modulation which can be fabricated more easily and at lower cost than previously available devices, the provision of a device having faster switching between write and erase modes as a result of the increased conductivity, and the provision of a method for producing and using such a device.

BRIEF DESCRIPTION OF THE DRAWINGS

FIG. 1(A, B) illustrates the top (A) and side (B) views of a light-modulating cell in the "erase" or "off" mode;

FIG. 2(A, B) illustrates the top (A) and side (B) views of the light-modulating cell in the "write" or "on" mode upon the application of an electric current;

FIG. 3(A, B) illustrates the top (A) and side (B) views of the light-modulating cell maintaining the "write" mode;

FIG. 4(A, B) illustrates the top (A) and side (B) views of the light-modulating cell in the "erase" mode upon the application of an electric current in a direction opposite to that applied during the "write" mode;

DESCRIPTION OF PREFERRED EMBODIMENTS

Figure 5:
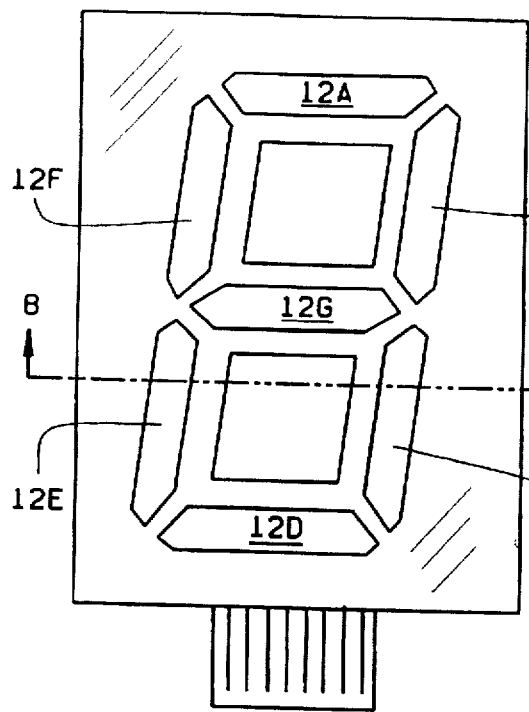
FIG. 5 illustrates a seven-segment display constructed from several light-modulating cells of the present invention.

A light-modulating cell 1 constructed in accordance with the present invention is shown in FIGS. 1–4. In the cell an optically transparent working electrode 3 is disposed in contact with an electrolyte layer 2 on a top side of the electrode. The bottom side of electrode 3 contacts substrate 5. Disposed laterally to the working electrode 3 and in contact with the electrolyte layer 2 is a counter electrode 4, which on its bottom side, also contacts substrate 5. Substrate 5 can comprise a rigid layer, e.g. of glass, or a flexible layer, e.g. of polyester or polyimide film, and is provided as a support structure. However, other suitable nonconductive materials may be used for the substrate, and in some applications of the present invention, the substrate might be omitted.

The electrolyte layer 2 in certain preferred embodiments has a thickness in the range of a few microns to a few tens of microns, and is composed of a mixture having a relatively solid consistency. As disclosed in U.S. Pat. No. 5,080,470, the electrolyte mixture comprises water, and a water-thickening polymeric resin, a water-soluble salt of a metal which can be cathodically deposited from an aqueous solution which also contains a neutral salt.

A "write" mode is established by inducing a current as shown in FIG. 2B. A negative voltage is applied to the working electrode 3 with respect to the counter electrode 4, which induces a current to flow from the counter electrode 4, through the electrolyte layer 2, and to the working electrode 3. This current causes the electrical deposition of the metal and increases the optical density of the interface region 6 between the working electrode 3 and the electrolyte layer 2. The optical density in the write mode is maintained after the voltage is removed, as shown in FIG. 3.

An "erase" mode is established by inducing a current as shown in FIG. 4. The current flows from working electrode 3, through electrolyte layer 2, and to counter electrode 4. Hence, the current in the erase mode flows in a direction opposite to the direction of the current in the "write" mode. This is accomplished by applying a positive voltage on the transparent working electrode 3 with respect to the counter electrode 4. As a result, anodic oxidation of the electrode-posited metal causes the metal to dissolve in the aqueous electrolyte layer, thereby decreasing the optical density of interface region 6 which was increased during the "write" mode. This cycles the light-modulating cell 1 back to the "off" state shown in FIG. 1. The voltages applied to the light-modulating cell 1 to produce the "write" and "erase" modes can range from a fraction of a volt to several volts, depending upon the overall conductivity of the cell. Typically, however, the preferred voltage is less than three volts.

Although the cycling between the "write" and "erase" modes can be accomplished as represented in FIGS. 1–4, the present invention can also be used to produce varying degrees of light transmission depending upon the amount and direction of current, as well as the length of time over which the current is applied. Thus, the cell may be rendered optically translucent, instead of optically opaque, such that only a desired fraction of the light incident upon the cell is transmitted. Thereafter, the transmitted light can be further modulated by either applying additional current to further increase the optical density of interface region 6, or applying a current in the opposite direction to decrease the optical density.

The metal present in the electrolyte layer is one that can be cathodically deposited by electrocrystallization, and then subsequently anodically oxidized and dissolved. The metal salt is present in the electrolyte layer in an amount typically from about 1 to about 50 parts by weight. Suitable metals include, for example, zinc, cadmium, lead, silver, copper, iron, cobalt, nickel, tin, indium, bismuth, gallium, mercury, and alloys thereof. The metal used in the preferred embodiment is bismuth. The above list of suitable metals is exemplary only, and one skilled in the art will appreciate that other suitable metals, and alloys thereof, can be used so long as they satisfy the criteria set forth above.

The electrolyte layer comprises a water thickening polymeric resin, e.g. typically a solution or colloidal dispersion. The polymer is present in the electrolyte typically in an amount from about 1 to about 50 parts by weight. Suitable polymer resins are water soluble polyoxyalkenes, polyvinyl polymer resins, polyvinyl alcohols, cellulosic ethers, and mixtures thereof. The polymer resins typically have a molecular weight between about 10,000 and about 10,000,000. In the preferred embodiment, the water soluble resin is hydroxyethyl cellulose.

Since the half cell reaction at the working electrode is a cathodic reduction of metal, e.g. bismuth, there is a need for a corresponding anodic half cell reaction at the counter electrode. Useful anodic half cell reactions include the oxidation of bromide anions to bromine, the oxidation of the emeraldine form of polyaniline to pernigraniline, and the oxidation of a soluble hydroquinone to a quinone. In the embodiment employing bromine, it is preferable to use a gas adsorbing material such a carbon as the counter electrode. In other cases where a gas is not produced by the oxidation reaction, the oxidizable species, e.g. hydroquinone or polyaniline, can be present as an electrode coating.

The electrolyte layer can also contain additional materials that do not react chemically with the other constituents of the electrolyte layer such as water-soluble dyes. Such dyes can impart any color that is desired to the transmitted light.

The working electrode comprises a material having the properties of electrical conductivity and substantial optical transparency. The working electrode has a suitable thickness for achieving these properties, and typically has a thickness from about one micron to a about 100 microns. The transparent working electrode can comprise gold or a conductive metal oxide such as antimony-doped tin oxide (ATO), fluorine-doped tin oxide (FTO), or tin-doped indium oxide (ITO).

The counter electrode comprises a thin layer or sheet of electrically conductive material. Suitable materials for the counter electrode include carbon, intrinsically conductive polymers such as polyaniline or polypyrrole, metal such as copper, silver, nickel or alloys or mixtures thereof; such materials can form the counter electrode either as a thin layer or as particles dispersed in a polymeric binder. The material of the counter electrode should be selected so as to be stable against corrosive effects of the anode reaction. In this regard, preferred counter electrodes comprise ITO, ATO or carbon.

The electrolyte layer can be prepared or applied by any of the thick film techniques known in the art, including silk screening, air gap, helical wire bar, scraper, extrusion, and immersion. Application can be to any suitable transparent substrate, such as a glass plate or a sheet of plastic material, followed by interfacing the substrate and electrolyte layer to the transparent working electrode and the counter electrode. Alternatively, the transparent working electrode and counter electrode can first be deposited on a substrate and the electrolyte layer applied thereto. When utilized, the transparent substrate serves as the back surface of the light-modulating device.

The transparent working electrode can be deposited onto a substrate by any technique known in the art including, for example, by printing onto the substrate. Alternatively, the working electrode can be applied by chemical or physical vapor deposition. The transparent working electrode is in the shape of a desired pattern for light transmission. The pattern can be produced by any method known in the art, such as, for example, by deposition of a single continuous surface on the substrate of the device, followed by selective etching to produce the desired pattern, or by utilizing a masking device so that the desired pattern of the working electrode can be applied to the substrate in a single step.

The counter electrode can be deposited on the substrate by any of the thick film techniques known in the art, including silk screening, air gap, helical wire bar, scraper, extrusion, and immersion. Alternatively, the counter electrode can comprise a thin sheet of metal or graphite, or a plastic material filled with carbon or metal particles, and be directly applied to the substrate.

In the preferred embodiment, the working and counter electrodes are electrically coupled to a voltage or current source by printed conductive traces provided on the substrate. For large electrodes, a thin meshwork of a metallic conductor can be placed under the working electrode, as well as under the counter electrode, to provide an even current distribution through the electrodes.

Additionally, the light-modulating device of the present invention can be used in conjunction with an opaque mask for covering the counter electrode and masking everything in the light path except the transparent working electrodes. Preferably, when such a mask is used, the mask will also cover the opaque printed traces used for electrically coupling the counter and working electrodes to a voltage or current source.

While the present invention has been described generally above, the following example of a preferred embodiment is provided to illustrate one of the many applications of the present invention.

EXAMPLE OF A PREFERRED EMBODIMENT

The following example is for a seven-segment display constructed from several light-modulating devices according to the present invention. As shown in FIG. 5, the panel 10 can selectively show one of the ten numerals from zero to nine by the transmission of light through a particular combination of the seven segments 12A–12G. As further described below, each segment 12A–12G constitutes a light-modulating cell for controlling the transmission of light therethrough. Thus, for example, if each cell associated with segments 12D–12G is in its "write" mode, thereby rendering those segments optically opaque, and each cell associated with segments 12A–12C is in its "erase" or "off" mode, thereby permitting the transmission of light therethrough, the numeral seven will be displayed.

Figure 6:
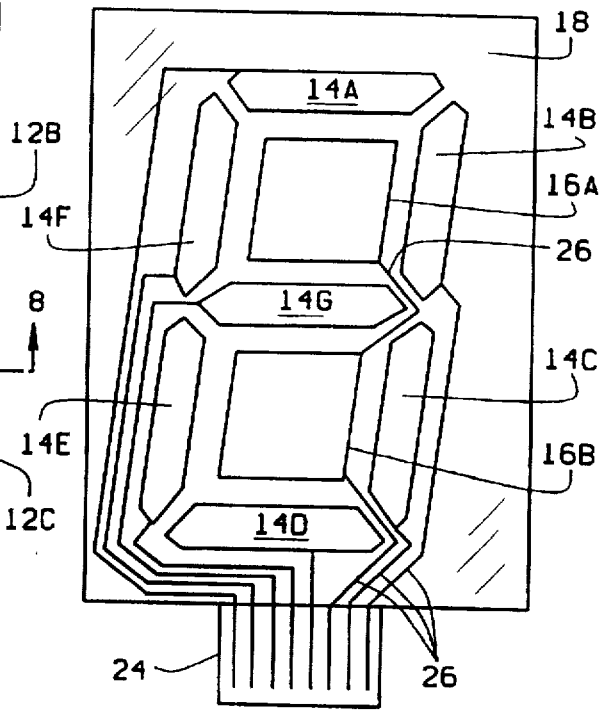
FIG. 6 illustrates a plurality of conductive traces on a substrate in the process of constructing the display of FIG. 5.
Figure 7:
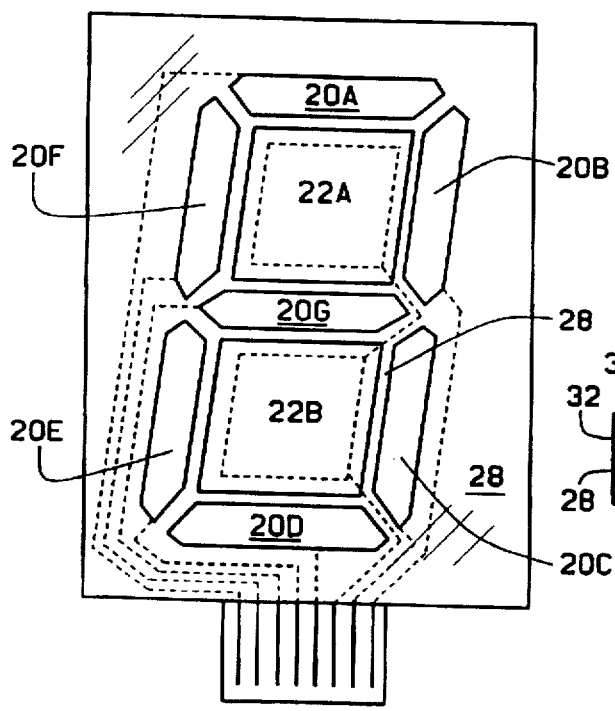
FIG. 7 illustrates the substrate of FIG. 6 after working and counter electrodes have been placed thereon.

To construct the display panel 10 of the working example, a plurality of conductive traces 14A–14G and 16A–16B are printed or positioned on a glass or mylar substrate 18, as shown in FIG. 6. The position of conductive traces 14A–14G corresponds to the subsequent placement of working electrodes 20A–20G, and the position of conductive traces 16A–16B corresponds to the subsequent placement of counter electrodes 22A–22B, as shown in FIG. 7. Conductive traces 14A–14G and 16A–16B are coupled with a connector 24 by a plurality of conductive traces 26. All of the conductive traces and the connector 24 will be utilized to electrically couple the working and counter electrodes to a voltage or current source. The printing or placement of the conductive traces can be accomplished by any of the various methods known in the art.

Once the conductive traces have been printed on substrate 18, a dielectric seal, e.g. any non-conducting polymer or resin, can be applied over the conductive traces 26, if necessary to prevent corrosive contact with the electrolyte. Thereafter, the working electrodes 20A–20F and counter electrodes 22A–22B can be applied or deposited onto their associated conductive traces, as shown in FIG. 7.

Figure 8:
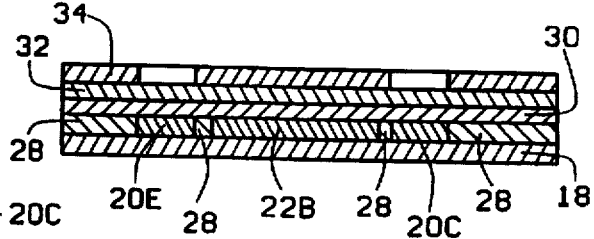
FIG. 8 is a cross sectional view taken along line 8—8 in FIG. 5.

As shown in FIGS. 7 and 8, a thin, nonconductive sealing layer 28 is then applied around the sides of the working and counter electrodes such that a top surface of sealing layer 28 is flush with the top surfaces of the electrodes. Thereafter, an electrolyte layer 30 is applied over the top surfaces of the electrodes by any of the thick film techniques. The provision of sealing layer 28 prevents the electrolyte layer 30 from contacting the sides of the electrodes and, as a result, prevents the metal in the electrolyte layer from depositing on the sides of the working electrodes during their write modes.

An additional sealing layer 32 is then applied over the electrolyte layer 30. Sealing layer 32 insulates the electrolyte layer 30 from any objects which may contact the top exterior surface of the panel 10, and prevents the aqueous solution contained in the electrolyte layer from evaporating. Finally, an optically opaque masking layer 34 can be applied over the top surface of the panel 10 to mask the counter electrodes 22A–22B and conductive traces so as to channel any and all of the transmitted light through segments 12A–12G. Preferably, mask segments 12A–12G are slightly smaller than working electrodes 20A–20G so as to mask out any effect on the transmitted light by the conductive traces 14A–14G.

Upon applying an appropriate current through selected working electrodes, corresponding segments of the panel are switched from the "off" or transparent mode to the "on" or opaque mode to display a desired alphanumeric character.

In view of the above, it should be understood that the several objects of the present invention are achieved, and that other advantageous results are attained. As various changes could be made in the above described methods and constructions without departing from the scope of the invention, it is intended that all matter contained in the above description be interpreted as illustrative, and not in a limiting sense.

What is claimed is:

1. In an electrochromic light-modulating device, the improvement wherein said device consists essentially of an electrode layer comprising at least one transparent electrode and at least one counter electrode laterally adjacent thereto and an electrolyte layer in contact with said electrode layer wherein said electrolyte layer contains an electrodepositable metal in solution, wherein on the application of an electrical current between said electrodes the optical density over said transparent electrode changes by the reversible deposition of said electrodepositable metal.

2. A device for modulating light transmission consisting essentially of:
   (1) an electrolyte layer comprising water, a salt of a metal which is reversibly deposited from an aqueous solution upon application of an electric current to thereby modulate said light transmission, a water-thickening polymeric resin, and a neutral salt;
   (2) an optically transparent electrode contacting the electrolyte layer;
   (3) a second electrode contacting the electrolyte layer and disposed laterally to the optically transparent electrode so that the working electrode and counter electrode are in a side-by-side arrangement; and
   (4) an anodically oxidizable species in contact with said second electrode.

3. A light-modulating device according to claim 2 wherein the metal is selected from the group consisting of zinc, cadmium, lead, silver, copper, iron, cobalt, nickel, tin, indium, bismuth, gallium, mercury and mixtures thereof.

4. A light-modulating device according to claim 3 wherein the water-thickening polymeric resin is selected from the group consisting of polyoxyalkenes, polyvinylpyrrolidones, polyvinylalcohols, cellulosics and mixtures thereof.

5. A light-modulating device according to claim 4 wherein said water-thickening polymeric resin is hydroxyethylcellulose.

6. A light-modulating device according to claim 5 wherein said optically transparent electrode comprises tin-doped indium oxide, fluorine-doped tin oxide or antimony-doped tin oxide.

7. A light modulating device according to claim 6 wherein the second electrode comprises carbon or a metal oxide.

8. A method for modulating light transmission consisting essentially of the steps of:

(a) providing on a transparent substrate
 (1) an optically transparent electrode and a second electrode disposed laterally to the optically transparent electrode so that the optically transparent electrode and second electrode are in a side-by-side arrangement;
 (2) an electrolyte layer in contact with said electrodes and providing an interface area therebetween, wherein said electrolyte layer comprises water, a salt of a metal which can be reversibly deposited from an aqueous solution upon application of an electric current, a water-thickening polymeric resin, and a neutral salt; and
 (3) an anodically oxidizable species in contact with said second electrode; and (b) passing a current from said second electrode through said electrolyte layer to said optically transparent electrode to increase the optical density in the interfacial region between said transparent electrode and said electrolyte.

9. A method according to claim 8 further comprising the step of passing a current from said optically transparent electrode through said electrolyte layer to said second electrode to decrease the optical density of said interfacial region.

* * * * *